Figure 1:
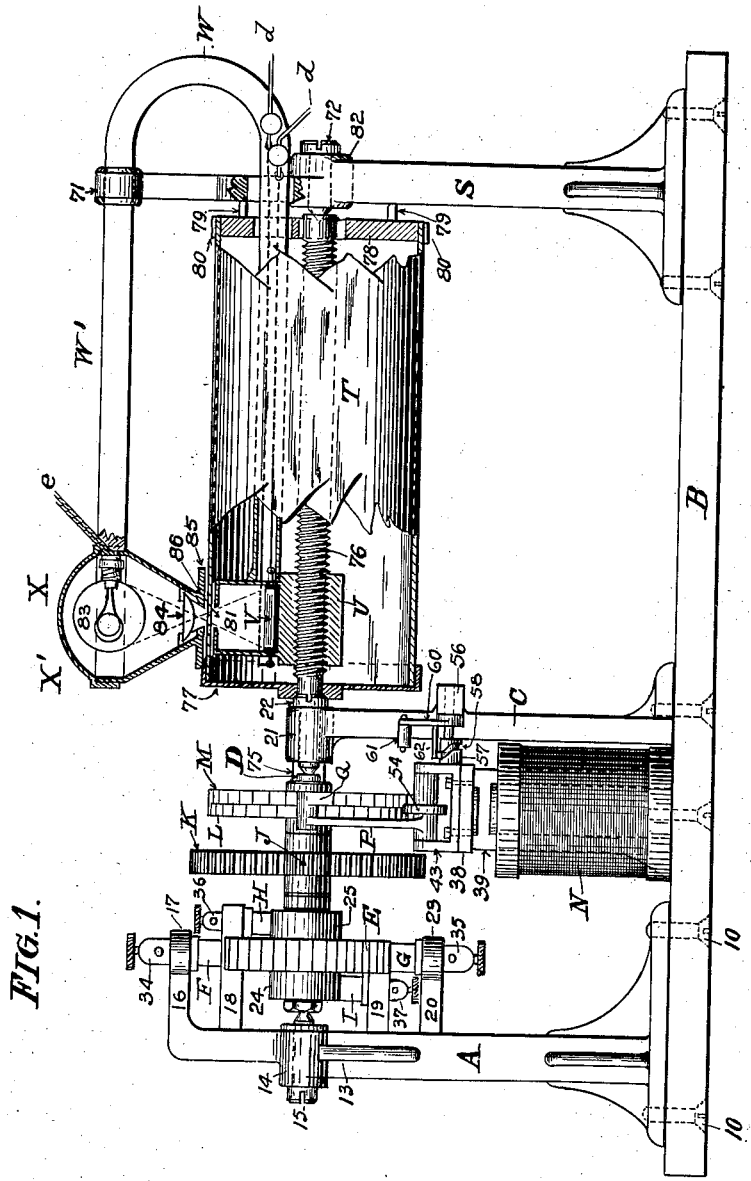

G. SELLERS.
ELECTRIC TRANSMISSION OF MESSAGES.
APPLICATION FILED NOV. 25, 1908.

939,339.

Patented Nov. 9, 1909.
5 SHEETS—SHEET 1.

Witnesses:
E. B. Knudsen
A. G. Peterson

Inventor:
Gilbert Sellers,
By Michael Stark & Lous,
Attorneys.

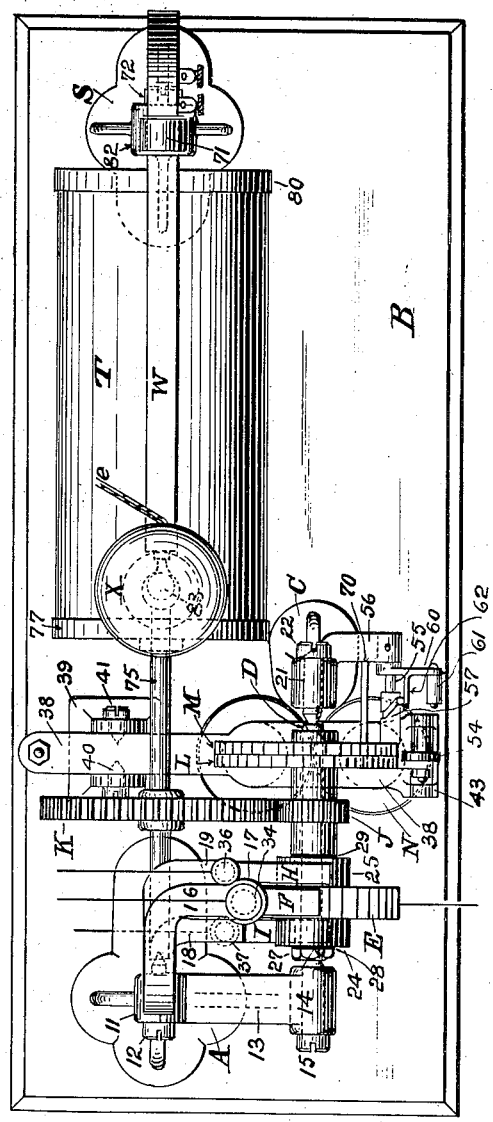

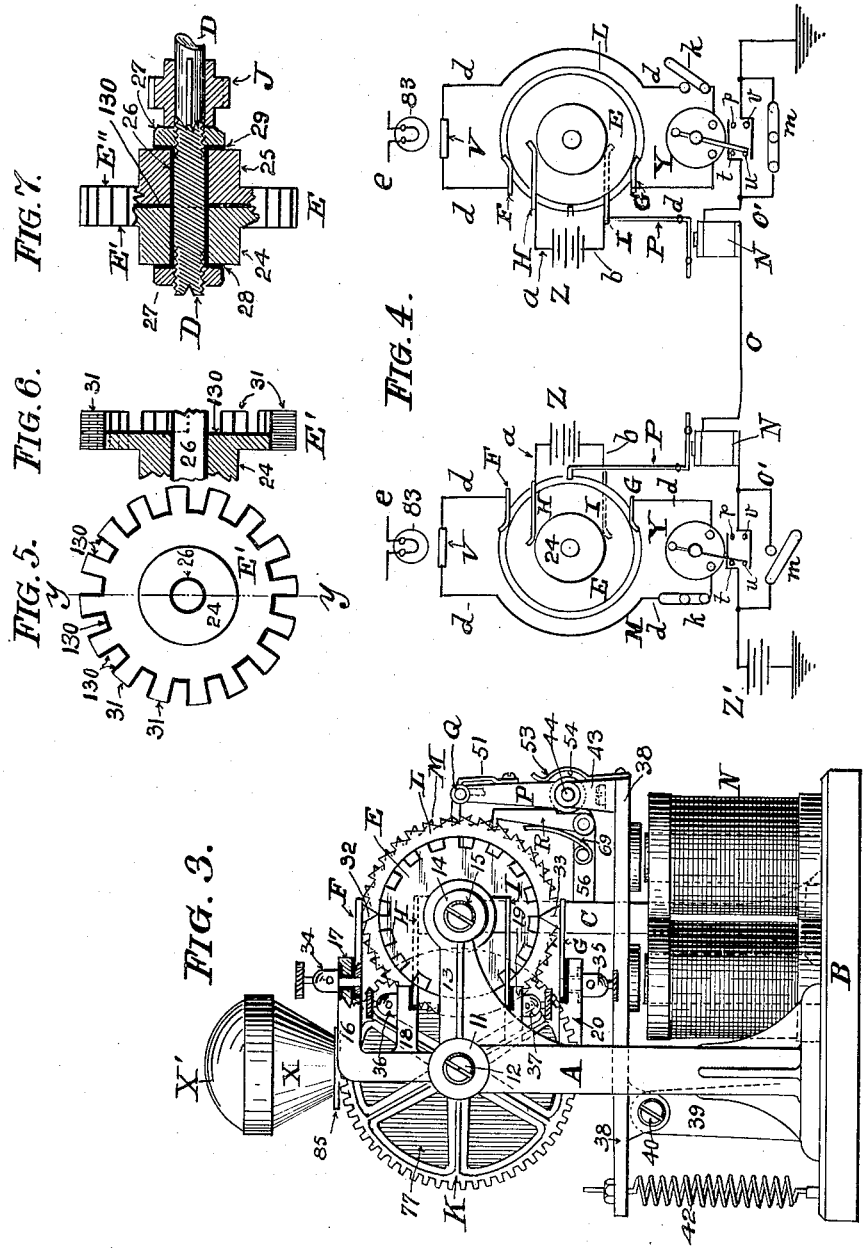

G. SELLERS.
ELECTRIC TRANSMISSION OF MESSAGES.
APPLICATION FILED NOV. 25, 1908.
939,339.
Patented Nov. 9, 1909.
5 SHEETS—SHEET 4.
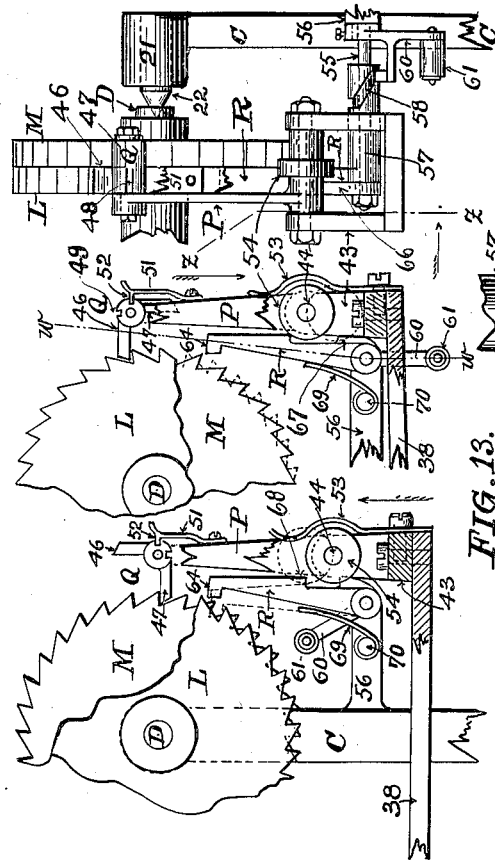
Witnesses:
C. B. Knudsen.
A. G. Peterson.
Inventor:
Gilbert Sellers,
By Michael J. Stark & Sons,
Attorneys.

G. SELLERS.
ELECTRIC TRANSMISSION OF MESSAGES.
APPLICATION FILED NOV. 25, 1908.
939,339.
Patented Nov. 9, 1909.
5 SHEETS—SHEET 5.
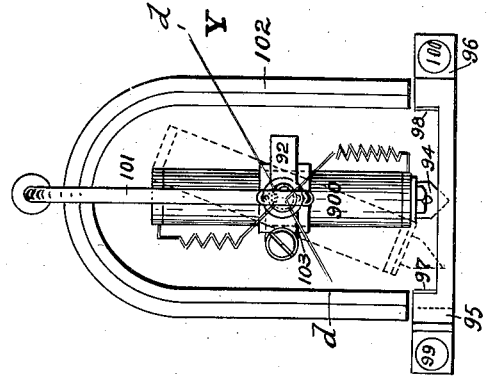
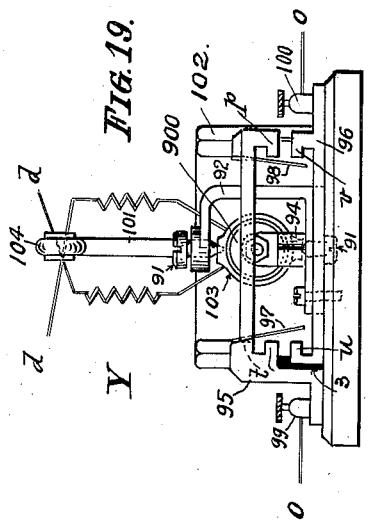
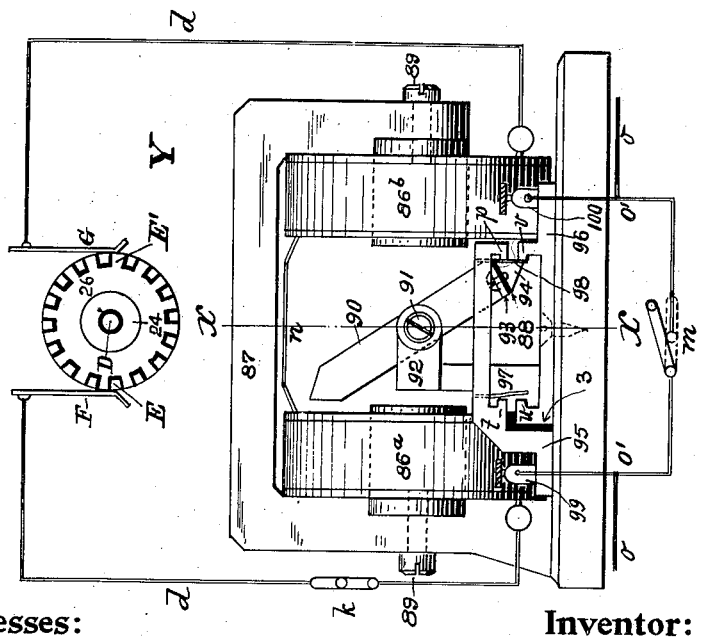
Witnesses:
C. B. Knudsen
A. G. Peterson
Inventor:
Gilbert Sellers
By Michael J. Stark & Sons
Attorneys.

UNITED STATES PATENT OFFICE.

GILBERT SELLERS, OF CHICAGO, ILLINOIS.

ELECTRIC TRANSMISSION OF MESSAGES.

939,339.

Specification of Letters Patent.

Patented Nov. 9, 1909.

Application filed November 25, 1908. Serial No. 464,488.

*To all whom it may concern:*

Be it known that I, GILBERT SELLERS, a citizen of the United States, residing at 134 East Superior street, Chicago, in the county of Cook and State of Illinois, have invented a new and useful Improvement in the Electric Transmission of Messages; and I do hereby declare that the following description of my said invention, taken in connection with the accompanying sheets of drawings, forms a full, clear, and exact specification, which will enable others skilled in the art to which it appertains to make and use the same.

The object of this invention is the production of an efficient device for transmitting graphic messages, such as a photograph, written or printed matter, &c., electrically to a receiving station and to reproduce this message at the receiving station.

In the present instance I use two instruments, one at the sending, and the other at the receiving station, and since these two instruments are alike and can be used for sending as well as for receiving messages, I shall, in describing the instruments (refer to them in the singular number only, except where changes are necessary to use a receiving instrument as a transmitter, in which case the change will be particularly pointed out. Generally speaking, this instrument includes a transparent cylinder, preferably of glass, and mounted upon a shaft and rotated by an electric motor, the message to be sent being bodily wrapped around said cylinder, it being produced upon a more or less transparent film so that rays of light may pass therethrough. This message is, by a step-by-step movement exposed to pencil of light-rays emanating from a source of light located on the outside of said cylinder which light-rays are caused to impinge upon an electrical conductor located within the cylinder and connected with the source of light to move in unison therewith. This electrical conductor is sensitive to light and increases and decreases in electrical conductivity with the greater and lesser intensity of the light projected thereupon. It is a part of a local circuit, and the varying impulses or currents in this circuit are caused to operate an electrical motor and mechanism for moving the cylinder with its message-sheet with greater or lesser rapidity, and at intervals of longer and shorter duration, corresponding with the greater and lesser density of said message-sheet. In order to produce this step-by-step movement, I include in the local electrical circuit a commutator and a galvanometer, all as will hereinafter more fully appear.

In the drawings already referred to, which serve to illustrate this invention more fully, Figure 1 is a side-elevation of this improved instrument. Fig. 2 is a plan of the same, and Fig. 4 an end-elevation thereof. Fig. 4 is a diagrammatic plan of the transmitting, and the receiving instruments and the various electrical circuits. Fig. 5 is an elevation of one of the commutator disks detached. Fig. 6 is a longitudinal sectional elevation of the same on line $y\,y$ of Fig. 5. Fig. 7 is a sectional elevation of the commutator complete. Fig. 8 is a vertical section of the galvanometer, taken on line $x\,x$ of Fig. 17. Fig. 9 is an elevation, partly in section, of the cylinder-revolving mechanism, the sectional portion being taken on line $z\,z$ of Fig. 11, in the direction indicated by an arrow in Fig. 11, and showing the position of the parts at the moment when the ratchet-disks are moved in one direction. Fig. 10 is a similar view showing the position of the parts at the commencement of the rotation of the ratchet mechanism in the opposite direction. Fig. 11 is an end-view of the same. Fig. 12 is a sectional elevation of the cam-mechanism which moves the ratchet-pawl from one to the other ratchet-wheel, the section being on line $w\,w$ of Fig. 10. Fig. 13 is a plan of the stop-arm which prevents the ratchet-wheels from moving farther than moved by the ratchet-pawls. Fig. 14 is a side-elevation of the same. Fig. 15 is a perspective view of the arm carrying the ratchet-pawls, and Fig. 16 is a perspective view of the ratchet-pawl detached. Fig. 17 is an elevation of the galvanometer and at the same time a diagrammatic view of the circuit connecting the galvanometer with the commutator. Fig. 18 is a plan of a modified form of galvanometer, and Fig. 19 is an end-elevation of the same.

Like parts are designated by corresponding symbols and characters of reference in all the figures.

A, in the drawings designates the main standard of the transmitting instrument, which standard is securely fastened to a suitable base B, by screws 10. This standard has, approximately in its middle, a boss 11, which is internally screw-threaded to receive a pointed set-screw 12, forming part of a bearing as will hereinafter more fully appear. From this boss 11 projects an arm 13, which arm terminates in a boss 14, which is also internally screw-threaded to receive a pointed set-screw 15. The upper end of the standard A is sidewise and forwardly bent at 16, and it terminates in a boss 17. From the side of this standard project curved arms 18 and 19, and below the latter arm there is a further arm 20.

C designates an auxiliary standard placed a suitable distance from the main standard A. It terminates in a boss 21, which is internally screw-threaded to receive a pointed set-screw 22, and between the point of this set-screw 22 and that of the set-screw 15, and revolving on these points, there is suspended a shaft D, shown in detail in Figs. 7 and 11, and which shaft I shall hereinafter term the motor-shaft. Upon this shaft D, there is located a commutator E, comprising two notched disks E' E'', illustrated in detail in Figs. 5, 6, and 7, which disks are alike and having the teeth 31 of one disk adapted to engage the spaces 30 of the opposite disk, the teeth 31 being of a length equal to the width of the face of the two disks when placed together, as shown in Fig. 7. There is on each disk, and preferably formed integral therewith, a boss 24 and 25, respectively. The central bore of these disks E' E'', is sufficiently larger than the diameter of the motor-shaft D to permit of placing therein an insulating sleeve 26, of rubber or other suitable insulating material, whereby the commutator disks are electrically insulated from the motor-shaft D. This shaft is screw-threaded at the end where the commutator disks are located to receive locking-nuts 27, by means of which the disks E' E'' are securely fastened to the motor-shaft D, insulating-disks 28, 29, being placed between the hubs 24 and 25 and the locking-nuts 27 to prevent metallic contact at these points. The two disks E' and E'' are thoroughly insulated from each other by insulations 130 between the disks and also at the flanks of the teeth 31, and in the bottom of the notches or spaces 30.

To the outer end of the arm 16 on the standard A there is secured a metallic contact piece or brush F, adapted to engage, and reach over, the face of the commutator disks E' E'' with its contact-piece 32; and to the outer end of the arm 20 there is secured a similar contact piece 33 on a brush G, which also bears upon the outer periphery of the commutator-disks; binding-posts 34 and 35 being located at the outer ends of the arms 16 and 20, which binding-posts are in metallic contact with the brushes F and G, but insulated from the respective arms 16 and 20, as are also the brushes F and G.

To the arms 18 and 19 on the standard A there are secured brushes H and I, respectively, which are insulated from said arms but are in metallic contact with the bosses or hubs 24 and 25 of the commutator-disks; there being binding-posts 36 and 37 respectively on said arms, the insulation of the binding-posts 36 and 37, and the brushes H and I from the arms 18 and 19 being the same as that of the brushes F and G and their binding-posts. From the binding-posts 36 and 37 lead wires $a$ and $b$ forming in conjunction with an electric source Z the local circuit already mentioned, and which supplies the commutator E with electric energy.

Upon the motor-shaft D there is mounted a gear-pinion J, and adjacent to this pinion there are fastened to the motor-shaft D two ratchet-wheels L and M, the teeth of which face in opposite direction and which wheels revolve the shaft D intermittently in the following manner: N designates an electric motor; preferably an electro-magnet having an armature 38, which is pivoted to a standard 39, by pointed set-screws 40 and 41, and which has a spiral spring 42 to keep the armature 38 normally from contacting with the cores of the electro-magnet N. At the forward end of this armature 38 there is a forked bracket 43 within which is pivoted a shaft 44, upon which is mounted an arm P, shown in detail in Fig. 15, said arm having on its upper end a boss 45, within which is pivoted a pawl or click Q, having two members 46 and 47, the member 46 being adapted to engage the ratchet-wheel L, and the member 47 to actuate the ratchet-wheel M. In the hub of this pawl Q there are two grooves 48 and 49, and on the face of the arm P there is a lug 50, to which a spring-catch 51 is secured. This spring-catch is adapted to engage the notches 48 or 49 in such manner that when the nose 52 thereon engages the notch or groove 49 the member 46 of the click Q is in operative engagement with the ratchet-wheel L, while when engaging the groove 48 the member 47 is in position to operate the ratchet-wheel M. In order to keep the arm P always in position to enable the click to engage the ratchet-wheel, a spring 53, is secured to the bracket 43, (said spring not being shown in Figs. 1, 2 and 11, to avoid obscuring parts behind said spring,) and bearing with its outer end upon said arm P. Upon the shaft 44 there is also located a roller 54, which roller engages a detent R, (omitted in Fig. 1, and not seen in Fig. 2,) to prevent the ratchet-wheels L and M from moving beyond the distance which they are moved by the ratchet pawls, which when the ratchet-wheels are moving rapidly, might happen owing to the momentum and the inertia of said wheels. This detent R is mounted upon a stud 55, and is shown in detail in Figs. 12, 13, and 14, said stud being secured to an arm 56, projecting from the standard C, and it has upon it a long sleeve 57 forming a part of the detent R. Near the end of this sleeve there is a cam-groove 58, and on the arm 56 there is a tubular boss 59, upon which is placed a lever 60, having a handle 61, by which it may be actuated, and which lever has a laterally-projecting arm 62 carrying a roller 63, on its end adapted to engage the cam-groove 58. This cam-groove 58 is of sufficient length and inclination to permit the lever 60 making approximately two-thirds of a revolution. The object of this device is to shift the detent laterally upon the stud 55 to engage either the ratchet-wheel L or M, as the case may be, with its projecting nose 64, the width of this nose being that of one of the ratchet-wheels. The detent R has in its face two grooves or depressions 65 and 66 to provide on said face projections 67 and 68, and this detent R is actuated by the roller 54 in the following manner: When the armature 38 vibrates, the roller 54 moves vertically on the face of the detent R in either one or the other of the depressions 65 or 66. Assuming the detent R is to engage the ratchet-wheel L, and the click 47 to move the ratchet-wheel M upwardly, as shown in Figs. 9 and 11, (it being understood that the detent R always engages the ratchet-wheel opposite the one that is moving the cylinder,) the roller 54 will be engaging the depression 66 in said detent, and the armature 38 moving upwardly, as shown in Fig. 9, just prior to the completion of this upward movement, the roller 54 reaches the point 68 and pushes the detent R toward the ratchet-wheel L to engage the nearest tooth in this ratchet-wheel, and thus, at the completion of the movement of the ratchet-wheel M prevent any further movement of said ratchet-wheels. To move the ratchet-wheel L, the click or dog 46 is turned in the position shown in Fig. 10, and the catch 51 caused to engage the groove 49 to lock the click Q to the arm P. Now the lever 60 is turned to draw the detent laterally over opposite the ratchet-wheel M. When now the armature 38 moves downwardly and thereby moves both ratchet-wheels which are fastened together upon the motor shaft D, the roller 53 will, just prior to the completion of the downward movement, strike the shoulder 67 in the depression 65 and force the detent R toward the ratchet-wheel M and thus arrest their further movement. To keep the detent R normally out of engagement with either ratchet-wheel, there is a spring 69, located upon a stud 70, projecting from the arm 56 on the standard C, as clearly illustrated in Figs. 9 and 10, acting upon said detent R.

In addition to the standards A and C, there is upon the base B a third standard, S, longitudinally in line with the standard A, and having an internally screw-threaded boss 82, provided with a pointed set-screw 72. Upon this set-screw, and the set-screw 12 in the standard A there is mounted a shaft 75, and upon this shaft 75 there is securely fastened a spur-wheel K, which is engaged by the pinion J on the motor-shaft D. This shaft 75 is, for approximately one-half of its length, screw-threaded as shown at 76 in Fig. 1, and upon it is mounted a dished head 77, and to this head there is secured the transparent cylinder T with one of its ends, the other end revolving upon a fixed disk 78 secured to the standard S by studs 79. The message to be transmitted is wrapped bodily around this cylinder T and secured thereto by spring-clasps 80, while if a message is to be received thereon, a sensitive sheet of prepared material, such as a photographic film, is wrapped around this cylinder.

Upon the screw-threaded portion 76 of the shaft 75 there is located a screw-threaded nut U, and secured to this nut, there is a light-tight, preferably circular, chamber 81, there being a small aperture 86, in the upper wall of said chamber 81 to permit light to enter therethrough. Within this chamber 81 there is located an electric conductor V, which is sensitive to light and which is properly insulated from the metallic parts of said chamber and which has suitable means for attachments of leads $d$ which leads are carried through a tubular arm W, secured to the nut U; said arm being bent into U-shape, as shown and having its member W' engaging an opening in a boss 71 at the upper end of the standard S. The member W' carries on its outer end and in axial line with the chamber 81, a preferably cone-shaped, light-chamber X, within which there is located an incandescent lamp 83, which is supplied with an electric current through the cords $e$, from any suitable source of supply, not shown. The top X' of the chamber X serves the purpose of a reflector, it being silvered on its inner surface and of correct curvature, preferably of parabolic contour. In the lower portion of this light-chamber X there is placed a condensing lens 84, there being on the lower end of said chamber X a laterally-projecting flange 85, in close juxtaposition to the cylinder T, to prevent light from entering the chamber 81 except through the opening 86 therein. The reflector X' is removably placed over the cone-shaped light-chamber X to obtain access to its interior for obvious purposes.

Y designates a galvanometer which is placed into the electric circuit comprising the leads $d$, of which the light-sensitive member V is a part, it being the local circuit which is supplied with electric energy from the source Z through the commutator and the brushes thereon. This galvanometer may be constructed in various manners, and in Figs. 4, 8, 17, 18, and 19, I have shown several forms of this galvanometer. In Figs. 8 and 17, an electro-magnet comprising the coils 86ª, and 86ᵇ, with their cores and the horseshoe bar 87 to which the coils are attached by screws 89, is shown, in the magnetic field of which is located a permanent magnet 90, pivoted centrally upon delicately pointed screws 91, arranged in a suitable supporting bracket 92. The lower end of this magnet 90 has a projecting arm 93, Figs 8 and 17, to which is attached a triangular contact-piece 94 suitably insulated from the arm 93 by the insulation 88. In front of the magnet 90 there is placed a metallic contact member 95, and a further contact member 96, properly insulated from each other by the insulation 3. Each of these two members or terminals 95 and 96 have contact-points, the member 95 having the points $t$ and $p$, and the member 96 the points $u$ and $v$ respectively. Two delicate platinum blades 97 and 98 are provided, which leave the circuit $o$, which is the transmission circuit hereinafter to be referred to, normally open, but which circuit is alternately closed by the magnet 90 forcing the platinum blade 97 in contact with the points $t$ and $u$, or by forcing the platinum blade 98 in contact with the points $p$ and $v$.

The galvanometer illustrated in Figs. 18 and 19 differs from the one heretofore described in so far that the magnet 102 is preferably a permanent magnet, and the magnet 900 an electro-magnet, which as a matter of fact is but a reversal of the order of elements heretofore described. In the galvanometer shown in Figs. 18 and 19, the electro-magnet 900 is surrounded in about its middle, by a band 103, wherewith pointed set-screws 91 engage. The wires from the coil of the magnet 900 pass through an eye 104 on a bracket 101, the eye 104 being approximately in the vertical center line of the pivotal points of said magnet so that the wires need twist but slightly when the magnet 900 is oscillating and thereby offer but slight resistance to the oscillatory movement of said magnet.

On the contact pieces 95 and 96 there are binding-posts 99 and 100 respectively, to connect the contact pieces with the transmission circuit $o$, while the wires of the spools 86ª and 86ᵇ are connected with each other by the wire $n$.

The operation of sending and receiving a graphic message is substantially as follows: By reference to the diagrammatic plan Fig. 4, it will be seen that the transmission circuit $o$, which receives its electric energy from any suitable source of supply Z', and which connects the transmitting instrument assumed to be on the left-hand side of Fig. 4, with the receiving instrument on the right-hand side, has shunts $o'$ at each station, there being in the shunts switches or cut-outs $m$, and in the local circuit $d$, switches or cut-outs $k$. The graphic message-sheet is bodily wrapped around the transmitting cylinder T and clamped thereto by the clamps 80. The light-chamber X is assumed to be at one end of the cylinder T and the light therein burning. At the sending station the local circuit $d$ is closed and the transmission circuit $o$ open while at the receiving station the local circuit is open and the transmission circuit closed by the switch in the shunt $o'$. The current flowing through the transmission circuit $o$ causes the armature 38 being attracted by the magnets N and thereby to rotate the ratchet-wheels as well as the commutator and the cylinders one step. This has the effect of reversing the current in the local circuit $d$ on account of the commutator making a one-step movement and the brushes thereon connecting with opposite poles, and the galvanometer needle 90 to be repelled from its then occupying position and to be attracted by the opposite pole, thereby swinging upon its pivots and opening the transmission circuit $o$. When the galvanometer needle 90 reaches the opposite pole, the transmission circuit is again closed, the ratchet-wheels and the commutator make another one-step movement, and these step-by-step movements are repeated as long as necessary to transmit the said graphic message. The rapidity of these step-by-step movements and the dwells between the movements are governed by the varying density of the message-sheet and the light passing therethrough and acting upon the light-sensitive conductor V in the dark-chamber and forming a part of the local circuit $d$. Thus when a dark portion of the message-sheet passes beneath the light-chamber, the movement of the galvanometer needle will be comparatively slow so that the intervals between the movements of the message-sheet become longer and the exposure at the receiving station also longer, and the dwells between the movements longer, and as the density of the message-sheet varies so will the duration of, or time consumed by, the steps and the intervals between the steps vary accordingly. There are in the ratchet-wheels as many teeth as there are sections in the commutator so that with each step of the ratchet-wheels the commutator brushes pass upon a different section thereof, and these sections being alternately positively and negatively excited, it follows that the current in the local circuit $d$ reverses with each step-movement of the ratchet-wheels.

The cylinders T with the message and the receiving sheets revolve in unison by a step-by-step movement, and with each rotative step movement the light-chambers X and the dark chambers 81 make a slight horizontal or lateral movement caused by the screw 76 revolving in the nut U, so that by this compound movement the pencil of light-rays passing out of the light chamber through the message-sheet, gradually touches every integral part thereof, and is reproduced at the receiving station in a like manner. At the receiving station the sheet upon which the message is to be reproduced is preferably a paper or celluloid film coated with a silver haloid which is affected by the rays of light and thereby reproduces the sent message invisibly, and has to be developed to render it visible by the various means known to photography. While receiving a message at the receiving station, the local circuit $d$ is cut out since the same performs no function in the receiving of a message, the rotating of the receiving cylinder being accomplished by the motor N and the mechanical means comprising the ratchet-wheels and other elements heretofore described. When a message has been transmitted and received, and the light and dark chambers have moved to the opposite end of the cylinders from which they have started, the next message is transmitted and received by reversing the movement of the cylinders in the manner and by the mechanism already described.

It will now be observed that the two instruments are alike and may be used interchangeably as transmitting or receiving instruments, the only change necessary to accomplish this object being to manipulate the switches $m$ and $k$ to open and close the transmitting and the local circuits correspondingly.

I have heretofore frequently mentioned the light-sensitive electrical conductor V in the chamber 81. This conductor is at present preferably a selenium cell, being a non-metallic element of the sulfur group, which so far as now known is the most sensitive substance affected in its electric conductivity by light. Other substances or metals may, however, be used if found to answer the purpose and I do not therefore wish to confine myself to the use of this substance.

I may here mention that in the receiving instrument an air-brush may be used to reproduce the sent message directly in color instead of indirectly by photographic means, and also that by the proper installation of the required instrumentalities in place of the wire-transmission circuit between the transmitting and the receiving instruments, the message may be transmitted and received through space by the Hertzian waves, and in my companion application for Letters Patent filed by me June 8, 1908, Serial No. 437,352, I have shown and described means for wireless transmission of graphic messages which may be successfully employed in connection with my present invention.

I am also well aware that many minor changes may be made in the details of construction of these instruments without departing from the scope of my present invention.

Having thus fully described this invention, I claim as new and desire to secure to me by Letters Patent of the United States—

1. A system of electrical transmission of graphic messages, including a message-sheet of varying intensity and density; a source of light the rays of which are projected through said message-sheet; an electrical circuit the electrical resistance of which is governed by the light passing through said message-sheet; means for alternately changing and reversing the electrical current in said circuit, and means for moving the message-sheet bodily past said source of light by a step-by-step movement.

2. A system of electrical transmission of graphic messages, including a message-sheet of varying density; a source of light; means for projecting the rays of light from said source through said message-sheet; a local circuit; an element in said local circuit which is light-sensitive and changes its electro-conductivity under the influence of light passing through said message-sheet; a transmission circuit; means in said transmission circuit for moving the message-sheet bodily by a step-by-step movement past said source of light, and means in said local circuit for alternately reversing the current in said local circuit to initiate the operation of the means that move the message-sheet.

3. A system of electrical transmission of graphic messages including a source of light; a message-sheet of varying density; mechanism for moving said message-sheet bodily by a step-by-step movement past said source of light; a local electrical circuit the electrical resistance of which is governed by the varying intensity of the light passing through said message-sheet; a commutator in said local circuit; a galvanometer in said local circuit; an electrical transmission circuit, said galvanometer being adapted to open and close the transmission circuit, and means in the transmission circuit adapted to rotate said commutator and to operate the mechanism that moves the message-sheet, said commutator comprising two disks each having a series of peripheral sections interlocking with, and electrically insulated from, the other; a source of electrical energy supplying the local circuit of which the commutator disks form a part, one of said disks being positively, and the other negatively charged.

4. A system of electrical transmission of graphic messages including a source of light; a message-sheet of varying density; mechanism for moving said message-sheet bodily by a step-by-step movement and at intervals of longer and shorter duration of time past said source of light; a local electro-circuit the electrical resistance of which is varied by the varying intensity of the light passing through said message-sheet; a transmission circuit; a galvanometer in the local circuit and adapted to open and close the transmission circuit; a commutator in the local circuit adapted to alternately reverse the current flowing through said local circuit to actuate said galvanometer, and means in the transmission circuit adapted to rotate said commutator intermittently and to operate the mechanism that moves the message-sheet.

5. A system of electrical transmission of graphic messages including a source of light; a message-sheet of varying density; mechanism for passing said message-sheet bodily by a step-by-step movement past said source of light; a local electrical circuit; a selenium cell in said local circuit; means for projecting the rays of light from said light-source through said message-sheet upon said selenium cell, whereby the electro-conductivity of the local circuit is caused to vary in accord with the varying intensity of the rays of light passing through said message-sheet; a galvanometer in said local circuit; a commutator in said local circuit and including two interlocking, electrically insulated disks one of which is positively and the other negatively excited; an electrical transmission circuit; means in said transmission circuit adapted to move the message-sheet and the commutator intermittently, said galvanometer being adapted to open and close the transmission circuit.

6. In an instrument for electrically transmitting graphic messages, the combination of a local circuit including a source of electricity, a commutator, and a galvanometer, and a transmission circuit, controlled by said galvanometer, there being in said transmission circuit means for rotating the commutator intermittently whereby the commutator causes the alternate reversal of the current in the local circuit and actuates the galvanometer to open and close the transmission circuit.

7. In an instrument for transmitting electrically graphic messages, an electric transmission circuit; an electro-motor in said transmission circuit; a ratchet-wheel; means for operating said ratchet wheel intermittently by said electro-motor at intervals of longer and shorter duration; a commutator connected with said ratchet-wheel and revolving therewith, and a local electro-circuit of which said commutator is a member, said commutator being adapted to alternately reverse the current flowing through said local circuit.

8. In an instrument for electrically transmitting graphic messages, the combination, with standards having bearings as described, of a motor-shaft journaled in said bearings; a ratchet-wheel upon said motor-shaft; a commutator upon said motor-shaft and revolving with said ratchet-wheel, said commutator including two disks having interlocking sections insulated electrically from each other; brushes on said commutator; a local electrical circuit connected with said brushes; a source of electro-energy supplying the local circuit, and means for rotating the commutator and the ratchet-wheel intermittently.

9. A system of electrically transmitting graphic messages including a source of light; a message-sheet of varying density; a transparent cylinder around which said message-sheet may be bodily clamped; a dark-chamber; means for projecting the rays of light from said source of light into said dark-chamber; a selenium cell in said dark chamber adapted to receive the rays of light entering the dark-chamber; a local electrical circuit of which said selenium cell is a member; an electro-motor; mechanism operated by said electro-motor for rotating said message-sheet and laterally moving the source of light and the dark chamber by a step-by-step movement to successively expose every integral part of said message-sheet to said source of light; a commutator including two interlocking disks electrically insulated from each other, one of said disks being positively, and the other negatively excited, and a galvanometer in said local circuit, said commutator being adapted to alternately reverse the current flowing in said local circuit to operate said galvanometer, said galvanometer being adapted to open and close a transmission circuit.

GILBERT SELLERS

Witnesses:
W. H. MAXWELL,
GENE SIMANOVSKY.